Nov. 17, 1953
C. E. BURKE
2,659,420
BACK REST
Filed Oct. 8, 1948
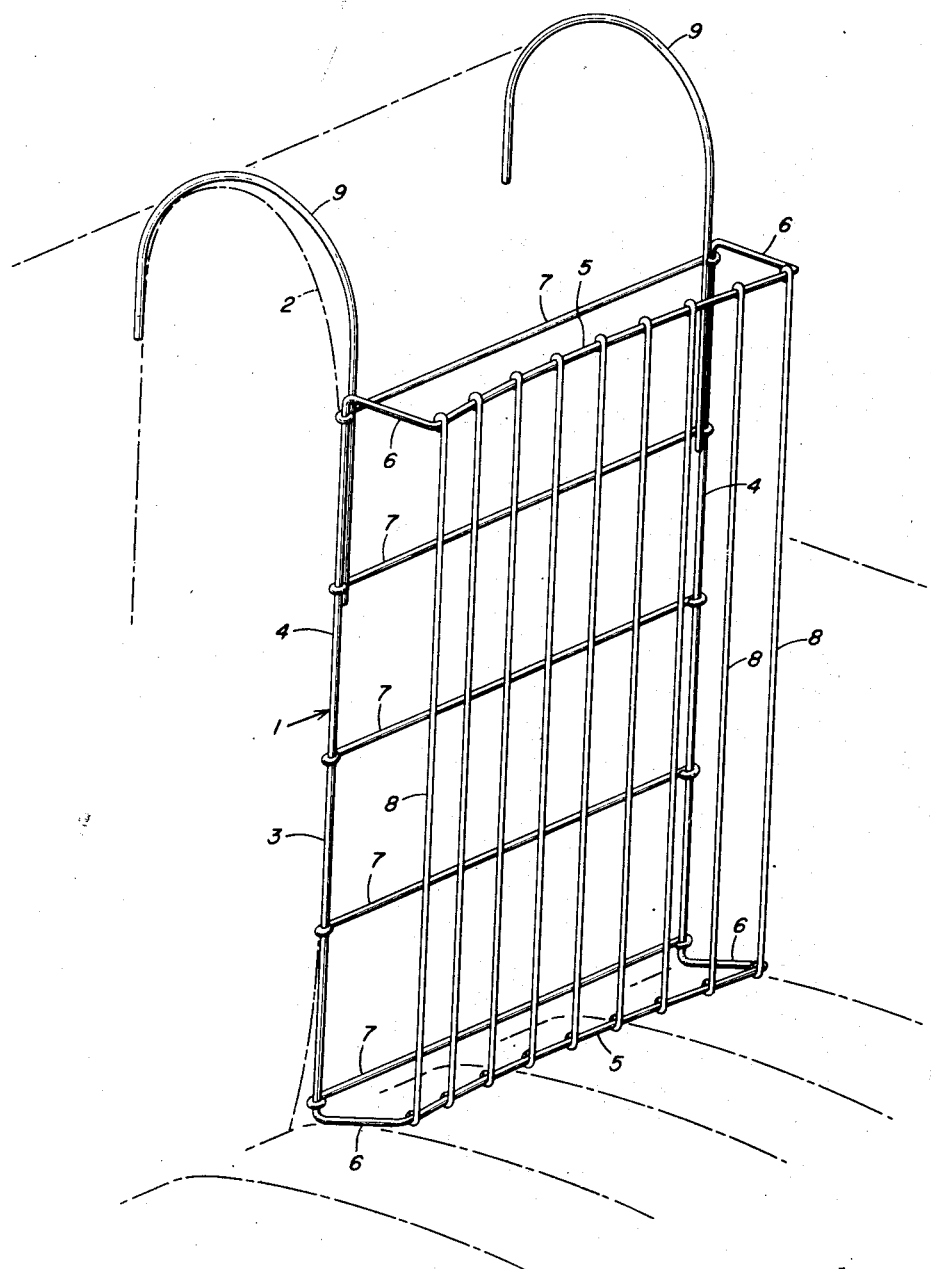
Inventor:
Charles E. Burke
By Ernest J. Mechlin
his Attorney Patented Nov. 17, 1953

2,659,420

UNITED STATES PATENT OFFICE 2,659,420

BACK REST

Charles Edward Burke, Norfolk, Va.

Application October 8, 1948, Serial No. 53,460

4 Claims. (Cl. 155—182)

This invention relates generally to back rests and more particularly to those of the air-cooled type for automobile and other use.

It has long been known that the lack of adequate air circulation is responsible for the "wet" back experienced in the summer by occupants of covered seats and particularly those of automobiles. To provide relief from this cause many devices have been developed of greater or lesser complexity to permit circulation of air between the seat and the back of the occupant. In common, such devices accomplish their purpose by providing a back support spaced outwardly of the seat, the back rest being of such construction as to permit circulation of air. However, by reason of their relative complexity and consequent expensiveness, such devices have had comparatively limited adoption.

It is the object of this invention to provide a back rest of simple and inexpensive construction which is yet very effective in operation.

Another object of the invention is to provide an improved air-cooled back rest of such weight as to be carried readily and applied to an automobile or other seat on which air circulation about the back is desired.

Other objects and advantages of the invention will appear hereinafter in the detailed description, be particularly pointed out in the appended claims, and illustrated in the accompanying drawing, in which:

Figure 1 is a perspective view of a preferred embodiment of the back rest of the present invention.

Referring now in detail to the drawing, illustrating a preferred embodiment of the invention and in which like reference characters designate like parts, the air-cooled back rest of the present invention, designated generally as 1, has been shown applied to an automobile seat indicated diagrammatically at 2, this type of seat having been chosen merely for purposes of illustration and the back rest being equally adaptable to upholstered chairs or other covered furniture.

The back rest comprises a frame or frame member 3 of substantially box shape. The frame may be formed of resilient or flexible wire, rod or like material, the resultant resiliency of the frame enabling it to provide a cushion for the back of the seat occupant. Bed spring wire of about 9-gauge has been found particularly suited for this purpose. The frame may be formed as an integral or continuous member of a single wire, the ends of the latter being joined together, as by welding, after the wire has been bent or otherwise made to assume the desired shape.

The frame 3 comprises spaced side rods or bars 4 joined by end rods or bars 5, the end rods being offset or outstanding from the side rods 4 and connected thereto by spacers 6. A pair of side rods 4 is employed in the illustrated embodiment, the rods extending longitudinally of the seat back 2 and being connected adjacent their offset ends by a pair of spaced transversely extending end rods 5, the side and end rods and the spacers 6 by which the pair of rods are connected all being formed in one piece.

To adapt them to fit the back of the seat occupant, the upper and lower end rods 5 are preferably arcuately concave or bent or curved inwardly. Additionally, the ends of the transverse end rods terminate short of or are contained within the side rods, with the connecting spacers 6 outslanting toward the back of the rest, to increase the flexibility or resiliency of the frame.

To prevent spreading or other relative transverse displacement of the side rods 4 on application of force to the end rods 5, the former are connected by links or connectors 7. For this purpose a plurality of spaced substantially parallel links may be employed which extend transversely across and connect the side rods and may be formed of the same resilient wire or like material as the frame.

The back-supporting surface of the back rest is formed by a plurality of spaced longitudinally extending resilient links or connectors 8 of wire, rod or the like, the aforementioned 9-gauge spring wire having been found suitable for this purpose, as well. By spacing these links or supporting members 8 relatively closely, a resilient or yielding surface is obtained against which an individual can rest his back with complete comfort, without resort to a pad or other covering.

It is usually desirable that some means be provided for attaching the back rest to a seat, particularly when used in automobiles. In the illustrated embodiment this is accomplished by the provision of spring hooks or other resilient attaching means 9 of wire, rod or the like, which may be either fixedly or adjustably secured to the frame 3 adjacent its upper end and are adapted to hook over the top of the seat back to which they are applied. At the opposite end of the frame the lower pair of spacers 6 may be inclined downwardly from the associated end rod 5 to facilitate their accommodation to the contour of the normal seat.

To prolong the life of the frame, particularly when made of material subject to rust or corrosion, its several members may be given a protective coating of paint, rubber or the like.

From the above detailed description it will be apparent that there has been provided a back rest formed of a plurality of resilient elements, which is comfortable without requiring a cover, affords a maximum of air circulation to the back of the seat occupant, and is of simple and economical construction. It should be understood that the described and disclosed embodiment is merely exemplary of the invention and that all modifications are intended to be included which do not depart either from the spirit of the invention or the scope of the appended claims.

Having described my invention, I claim:

1. An air-cooled back rest comprising a resilient frame member of substantially box shape having a pair of transversely spaced side rails and a pair of longitudinally spaced end rails extending between said side rails, said end rails being integral with and offset from said side rails, and spaced resilient means extending between and connecting each of said pairs.

2. An air-cooled back rest comprising a continuous resilient frame member having transversely spaced side rods and longitudinally spaced end rods offset from and extending between said side rods, means extending between and connecting said side rods, and a plurality of spaced resilient rods extending between and connecting said end rods.

3. An air-cooled back rest comprising a continuous resilient frame member having transversely spaced side rods and longitudinally spaced end rods offset from and extending between said side rods, certain of said end rods being arcuately concave, means extending between and connecting said side rods, and a plurality of spaced resilient rods extending between and connecting said end rods.

4. An air-cooled back rest comprising a continuous resilient wire frame having a pair of transversely spaced side rods and a pair of longitudinally spaced end rods offset from and extending between said side rods, said end rods being arcuately concave and having their ends terminating inwardly of said side rods, a plurality of spaced resilient wires extending between and connecting each of said pairs for substantially the length thereof, and resilient means for attaching said frame to a seat back.

CHARLES EDWARD BURKE.

References Cited in the file of this patent

UNITED STATES PATENTS

| Number | Name | Date |
|---|---|---|
| 1,356,493 | Kerr | Oct. 19, 1920 |
| 2,260,352 | Trapani | Oct. 28, 1941 |
| 2,301,032 | Fielding | Nov. 3, 1942 |
| 2,551,741 | Hopper | May 8, 1951 |
| 2,547,350 | Veale | Apr. 3, 1951 |